(12) United States Patent
Clark et al.

(10) Patent No.: US 7,408,111 B2
(45) Date of Patent: Aug. 5, 2008

(54) WALL MOUNT ASSEMBLY

(75) Inventors: Michael C. Clark, Columbiaville, MI (US); Aundrea Nurenberg, Brown City, MI (US)

(73) Assignee: TAPCO International Corporation, Wixom, MI (US)

( * ) Notice: Subject to any disclaimer, the term of this patent is extended or adjusted under 35 U.S.C. 154(b) by 0 days.

(21) Appl. No.: 11/614,635

(22) Filed: Dec. 21, 2006

(65) Prior Publication Data

US 2007/0224866 A1 Sep. 27, 2007

Related U.S. Application Data

(60) Provisional application No. 60/753,167, filed on Dec. 22, 2005.

(51) Int. Cl.
*H02G 3/14* (2006.01)
(52) U.S. Cl. .............................. 174/66; 174/67; 220/241
(58) Field of Classification Search .................. 174/66, 174/67; 220/241, 242
See application file for complete search history.

(56) References Cited

U.S. PATENT DOCUMENTS 5,594,206 A * 1/1997 Klas et al. ...................... 174/56
6,610,927 B2 * 8/2003 Dinh et al. ..................... 174/66

* cited by examiner

*Primary Examiner*—Dhiru R Patel
(74) *Attorney, Agent, or Firm*—Howard & Howard Attorneys, P.C.

(57) ABSTRACT

Wall mount assemblies operable to be mounted to a building are described. The wall mount assemblies include a base having a front surface and a rear surface and having a wall extending about an outer periphery and inwardly from the rear surface. The base also includes at least one edge recessed rearwardly from the front surface defining a recessed portion therein. The edge of the recessed portion also defines mounting apertures and/or mounting holes spaced about the recessed portion. An annular flange extends rearwardly from the recessed portion. A cover member mounts to either one of the mounting apertures and the mounting holes for creating an aesthetic appearance.

45 Claims, 11 Drawing Sheets

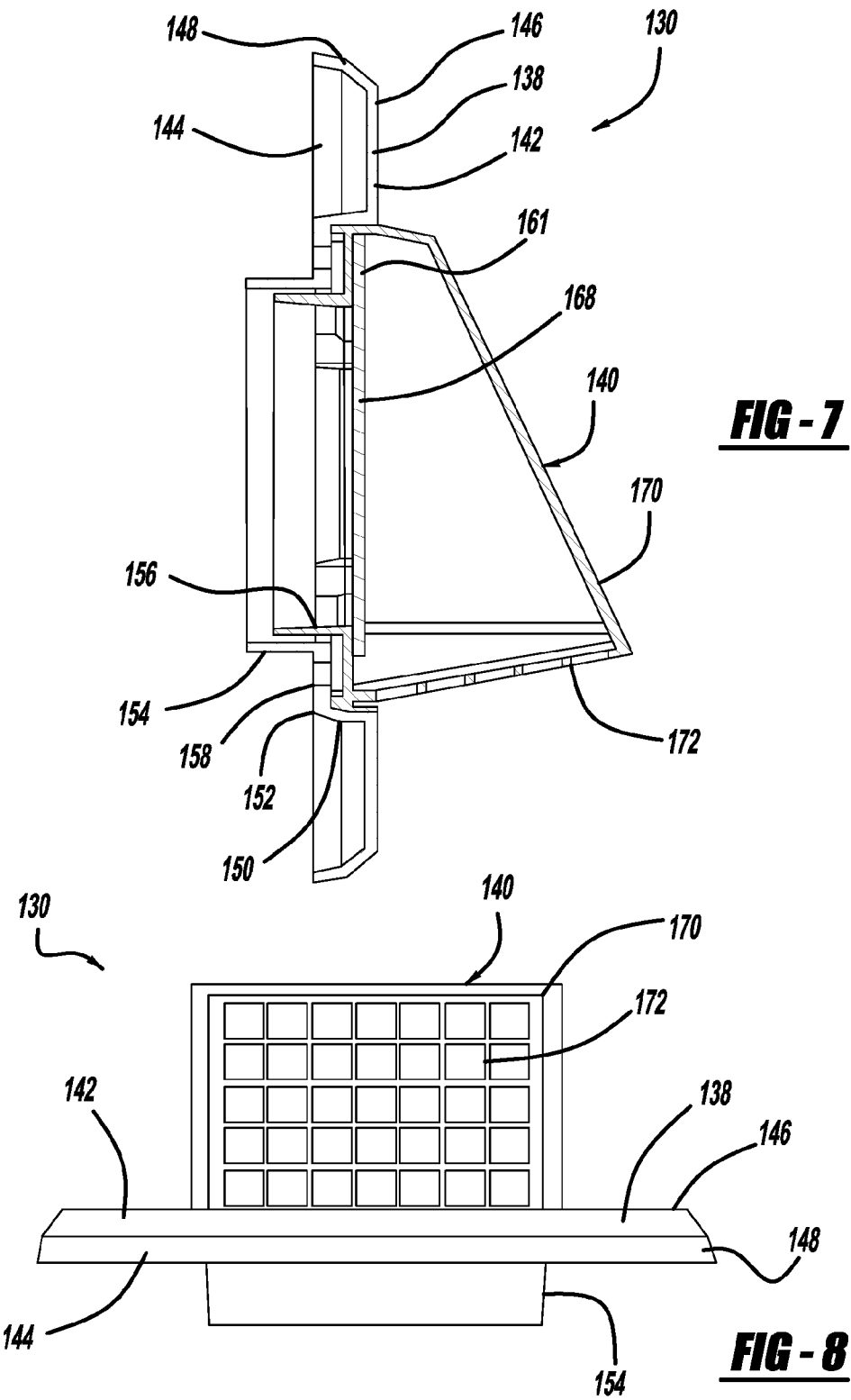

WALL MOUNT ASSEMBLY

CROSS-REFERENCE TO RELATED APPLICATION

The instant application claims priority to U.S. Provisional Patent Application Ser. No. 60/753,167, filed Dec. 22, 2005, the entire specification of which is expressly incorporated herein by reference.

BACKGROUND OF THE INVENTION

1. Field of the Invention

The present invention generally relates to a wall mount assembly for mounting to a building, and more specifically to a wall mount assembly that comprises a base capable of receiving various different inserts for different applications.

2. Description of the Related Art

Wall mount assemblies generally include a base member that attaches directly to a building prior to securing siding material to the building. After the base member is mounted to the building, the siding material is secured to the building, and then a cover member mounts to the base member. The cover member has a recessed portion for receiving an insert. Generally, the cover member has various sizes depending upon the particular application, such as vent hoods or wall mounts.

One drawback to the related art wall mount assemblies is that the base member is mounted underneath the siding material directly to the building. Therefore, the base member must be installed prior to the siding material. For existing buildings, the siding material must be removed.

Attempts have been made to manufacture one-piece wall mount assemblies that are mounted over the siding material and that do not require the base members. However, one drawback to one-piece wall mount assemblies is that multiple configurations are needed for different applications and the cost of manufacturing the multiple configurations is increased. Also, these assemblies require additional components to seal between the siding material and the assembly.

Accordingly, there exists a need for new and improved wall mount assemblies that overcome at least one of the aforementioned problems.

SUMMARY OF THE INVENTION

The present invention provides a wall mount assembly for mounting to a building. The wall mount assembly comprises a base having a front surface and a rear surface and having a wall extending about an outer periphery and inwardly from the rear surface. The base also has at least one edge recessed rearwardly from the front surface defining a recessed portion therein. The edge of the recessed portion also defines mounting apertures and mounting holes spaced about the recessed portion. An annular flange extends rearwardly from the recessed portion. A cover member mounts to either one of the mounting apertures and the mounting holes for creating an aesthetic appearance.

The present invention can be used as a universal connector for mounting various cover members to a building. Because a single base is operable with different cover members, manufacturing costs are lessened and installation is simplified. Additionally, the present invention mounts directly to the building without a member mounted beneath the siding material. Therefore, the wall mount assembly can be added to existing buildings without having to move the siding material and existing buildings can be retrofitted. Installation only requires the siding material to be removed, such as by cutting a hole, that corresponds to the annular flange.

In accordance with a first embodiment of the present invention, a mounting assembly operable to provide a wall mount for fastening to a structure is provided, comprising: (1) a base member, wherein the base member includes: (a) a substantially planar portion having a front surface and a rear surface; (b) an outer peripheral edge portion defining an outer wall portion extending from the front surface to the rear surface; (c) an inner peripheral edge portion defining an inner wall portion extending from the front surface to the rear surface; and (d) a substantially planar recessed portion disposed at a distal end of the inner wall portion being substantially parallel to the front surface and the rear surface; and (2) a cover member selectively operable to be brought into removable engagement with the base cover.

In accordance with an aspect of this embodiment, the inner wall portion includes an area defining at least one slot portion formed therein.

In accordance with another aspect of this embodiment, the cover member includes at least one tab member formed on a peripheral edge portion thereof.

In accordance with still another aspect of this embodiment, the tab member is selectively operable to be brought into removable engagement with the slot portion.

In accordance with yet another aspect of this embodiment, the recessed portion includes at least one area defining an aperture formed therein for receiving an object selected from the group consisting of a fastener, a sealant, and combinations thereof.

In accordance with still yet another aspect of this embodiment, the recessed portion includes at least one area defining an aperture formed therein, wherein an annular flange is formed about the aperture, wherein the annular flange extends from a front surface of the recessed portion towards a rear surface of the recessed portion.

In accordance with a further aspect of this embodiment, when the cover member is brought into removable engagement with the base cover, the cover member is substantially flush with the front surface of the base member.

In accordance with an additional aspect of this embodiment, the structure is a building having an exterior surface formed of a material selected from the group consisting of cementitious material, metal material, plastic material, wood material, and combinations thereof.

In accordance with a first alternative embodiment of the present invention, a mounting assembly operable to provide a vent hood for fastening to a structure is provided, comprising: (1) a base member, wherein the base member includes: (a) a substantially planar portion having a front surface and a rear surface; (b) an outer peripheral edge portion defining an outer wall portion extending from the front surface to the rear surface; (c) an inner peripheral edge portion defining an inner wall portion extending from the front surface to the rear surface; and (d) a substantially planar recessed portion disposed at a distal end of the inner wall portion being substantially parallel to the front surface and the rear surface, wherein the recessed portion includes at least one area defining an aperture formed therein, wherein an annular flange is formed about the aperture, wherein the annular flange extends from a front surface of the recessed portion towards a rear surface of the recessed portion; and (2) a vent hood cover system selectively operable to be brought into removable engagement with the base cover.

In accordance with an aspect of this embodiment, the inner wall portion includes a first area defining at least one slot portion formed therein and a second area defining at least one aperture formed therein.

In accordance with another aspect of this embodiment, the vent hood cover system comprises an insert member having a tab member extending therefrom and an area defining an aperture formed in a surface thereof, wherein the tab member is selectively operable to be brought into removable engagement with the slot portion of the first area of the inner wall portion.

In accordance with still another aspect of this embodiment, the vent hood cover system further comprises a flap member having a tab member extending therefrom, the tab member being selectively operable to be brought into removable rotational engagement with the aperture of the insert member.

In accordance with yet another aspect of this embodiment, the vent hood cover system further comprises a vent hood member having at least one tab member extending therefrom, the tab member being selectively operable to be brought into removable engagement with the aperture of the second area of the inner wall portion.

In accordance with still yet another aspect of this embodiment, the vent hood cover system further comprises a removable screen member selectively operable to be brought into removable engagement with the vent hood member.

In accordance with a further aspect of this embodiment, the insert member includes an area defining an aperture formed in a surface thereof, wherein the aperture of the insert member is substantially aligned with the aperture of the recessed portion.

In accordance with an additional aspect of this embodiment, the recessed portion includes at least one area defining an aperture formed therein for receiving an object selected from the group consisting of a fastener, a sealant, and combinations thereof.

In accordance with a further additional aspect of this embodiment, the structure is a building having an exterior surface formed of a material selected from the group consisting of cementitious material, metal material, plastic material, wood material, and combinations thereof.

In accordance with a second alternative embodiment of the present invention, a mounting assembly operable to provide a louver vent for fastening to a structure is provided, comprising: (1) a base member, wherein the base member includes: (a) a substantially planar portion having a front surface and a rear surface; (b) an outer peripheral edge portion defining an outer wall portion extending from the front surface to the rear surface; (c) an inner peripheral edge portion defining an inner wall portion extending from the front surface to the rear surface; and (d) a substantially planar recessed portion disposed at a distal end of the inner wall portion being substantially parallel to the front surface and the rear surface, wherein the recessed portion includes at least one area defining an aperture formed therein, wherein an annular flange is formed about the aperture, wherein the annular flange extends from a front surface of the recessed portion towards a rear surface of the recessed portion; and (2) a lover vent cover system selectively operable to be brought into removable engagement with the base cover.

In accordance with an aspect of this embodiment, the inner wall portion includes a first area defining at least one slot portion formed therein and a second area defining at least one aperture formed therein.

In accordance with another aspect of this embodiment, the louver vent cover system comprises an insert member having a tab member extending therefrom, wherein the tab member is selectively operable to be brought into removable engagement with the slot portion of the first area of the inner wall portion.

In accordance with still another aspect of this embodiment, the louver vent cover system further comprises at least one louver member having a tab member extending therefrom, the tab member being selectively operable to be brought into removable rotational engagement with the slot portion of the second area of the inner wall member.

In accordance with yet another aspect of this embodiment, the insert member includes an area defining an aperture formed in a surface thereof, wherein the aperture of the insert member is substantially aligned with the aperture of the recessed portion.

In accordance with still yet another aspect of this embodiment, the recessed portion includes at least one area defining an aperture formed therein for receiving an object selected from the group consisting of a fastener, a sealant, and combinations thereof.

In accordance with a further aspect of this embodiment, the structure is a building having an exterior surface formed of a material selected from the group consisting of cementitious material, metal material, plastic material, wood material, and combinations thereof.

Further areas of applicability of the present invention will become apparent from the detailed description provided hereinafter. It should be understood that the detailed description and specific examples, while indicating the preferred embodiment of the invention, are intended for purposed of illustration only and are not intended to limit the scope of the invention.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 7 is a cross-sectional view taken along line 7-7 in FIG. 6 of the wall mount assembly;

FIG. 8 is a bottom view of the wall mount assembly shown in FIG. 6;

The same reference numerals refer to the same parts throughout the various Figures.

DETAILED DESCRIPTION OF THE INVENTION

The following description of the preferred embodiment(s) is merely exemplary in nature and is in no way intended to limit the invention, or uses.

Referring generally to the Figures, a wall mount assembly is shown in accordance with the general teachings of the present invention. FIGS. 1-5 illustrate a first embodiment of the wall mount assembly 30 as a wall mount, FIGS. 6-12 illustrate a second embodiment of a wall mount assembly 130 as a vent hood, and FIGS. 13-20 illustrate a third embodiment of a wall mount assembly 230 as a louvered vent.

The wall mount assemblies 30, 130, and 230, respectively, can be mounted to a building (not shown) having a siding material (not shown) disposed thereon. The present invention is particularly useful when used in conjunction with a cement siding material (e.g., cement board); however, the present invention can also be practiced with other siding materials, such as vinyl (or other plastic materials) or aluminum (or other metal materials) siding materials. Additionally, wood type sidings, e.g., cedar shingles and/or the like, can also be used in conjunction with the present invention.

Figure 1:
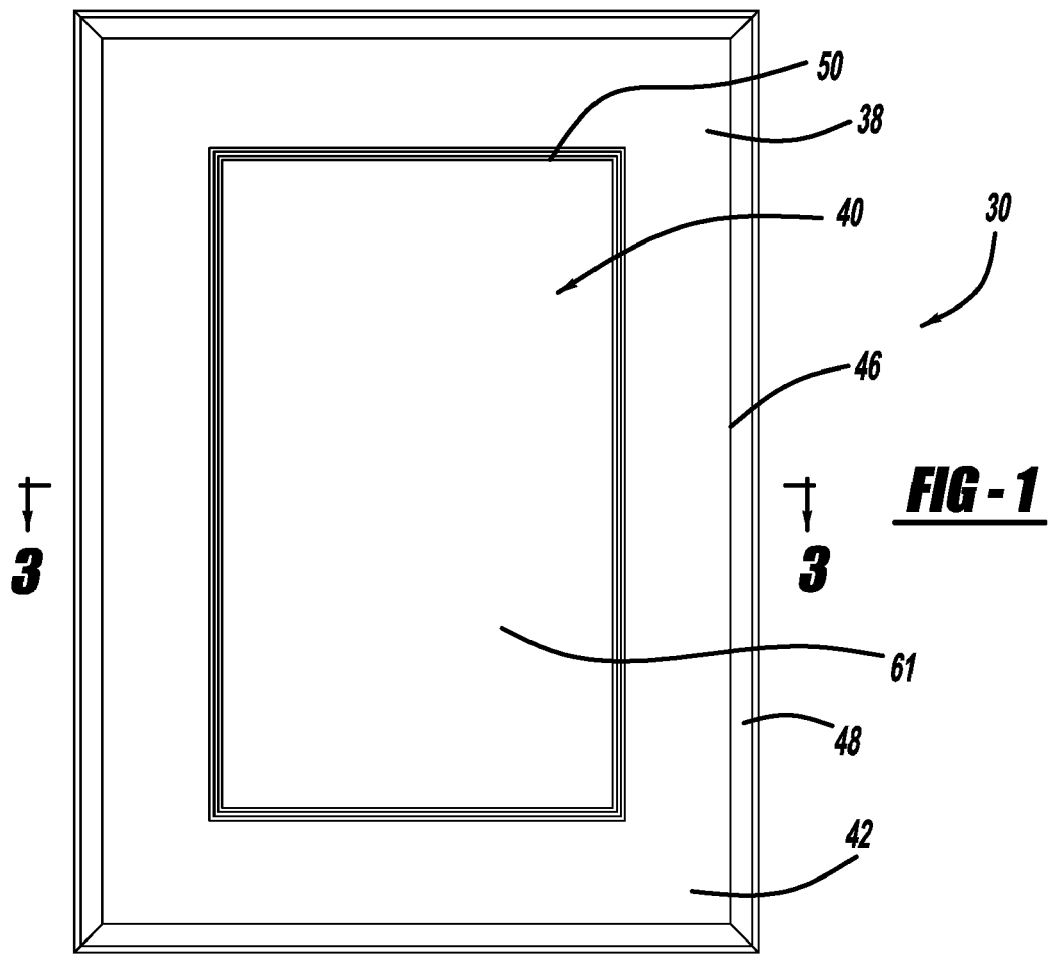
FIG. 1 is a front view of a first embodiment of a wall mount assembly according to the present invention.
Figure 2:
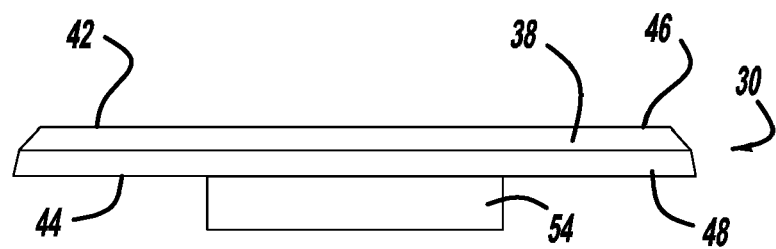
FIG. 2 is a bottom view of the wall mount assembly shown in FIG. 1.
Figure 3:
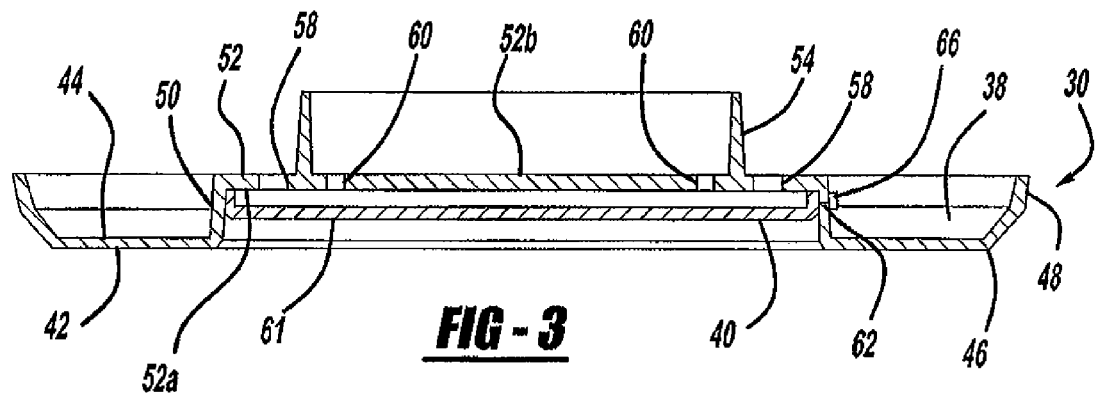
FIG. 3 is a cross-sectional view taken along line 3-3 in FIG. 1 of the wall mount assembly.

In FIG. 1, the wall mount assembly 30 generally comprises a base 38 and a cover member 40. The base 38 is generally planar and has a front surface 42 and a rear surface 44. The base 38 defines an outer periphery 46 and has a wall 48 extending about the outer periphery 46 and inwardly from the rear surface 44, as shown in FIGS. 2 and 3. FIG. 2 is a bottom view of the wall mount assembly 30 and FIG. 3 is a cross-sectional view of the wall mount assembly 30 taken along line 3-3 in FIG. 1. The wall mount assembly 30 can be used to secure various fixtures to the building, such as light fixtures, house numbers, ornamental fixtures, and the like. When the wall mount assembly 30 is mounted to the building, the wall 48 abuts against the siding material to create an aesthetic appearance. The base 38 can be any desired geometrical shape, such as rectangular, square, circular, or the like, depending upon the application of the wall mount assembly 30.

Figure 4:
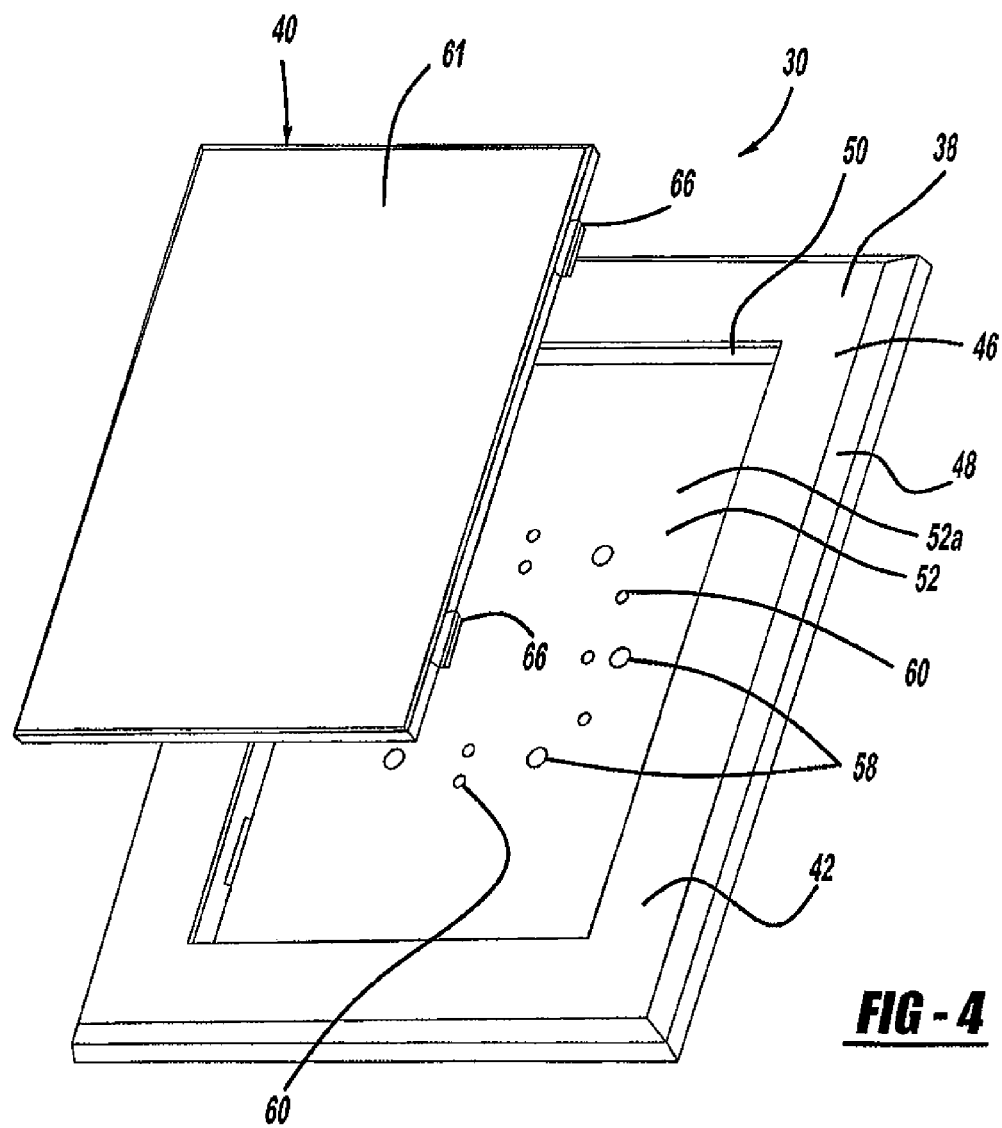
FIG. 4 is an exploded front perspective view of the wall mount assembly shown in FIG. 1.

Referring to FIG. 4, the base 38 further comprises at least one edge 50 recessed rearwardily from the front surface 42 defining a recessed portion 52 therein. The recessed portion 52 includes a front surface 52a and a rear surface 52b. Preferably, the edge 50 is continuous about the recessed portion 52; however, the edge 50 can be discontinuous. The recessed portion 52 can also have any desired geometrical shape depending upon the application of the wall mount assembly 30.

With reference back to FIG. 3, an annular flange 54 extends rearwardily from the recessed portion 52. The annular flange 54 can define an opening or can be closed depending upon the application of the wall mount assembly 30. In FIG. 4, the annular flange 54 is shown as closed. Additionally, the recessed portion 52 defines fastening holes 58 and trim holes 60 spaced about the recessed portion 52. Fasteners are inserted through the fastening holes 58 for securing the wall mount assembly 30 to the building. The trim holes 60 allow for finishing the attachment of the wall mount assembly 30 to the building.

For example, during installation, the siding material is removed in a shape corresponding to and slightly larger than the annular flange 54. The annular flange 54 is aligned with the opening in the siding material and fasteners are inserted through the fastening holes 58. Preferably, a sufficient amount of siding material is removed to allow the fasteners to directly engage the building without contacting the siding material. Alternatively, the fasteners could go directly through the siding material if the hole/cutout is not cut largely enough. A gap can be created between the siding material and the annular flange 54 if the opening in the siding material is larger than the annular flange 54. The trim holes 60 allow for additional trimming material, such as adhesives or sealants, to be applied in the gap or about the annular flange 54 to seal the wall mount assemblies 30, 130, and 230, respectively.

Figure 5A:
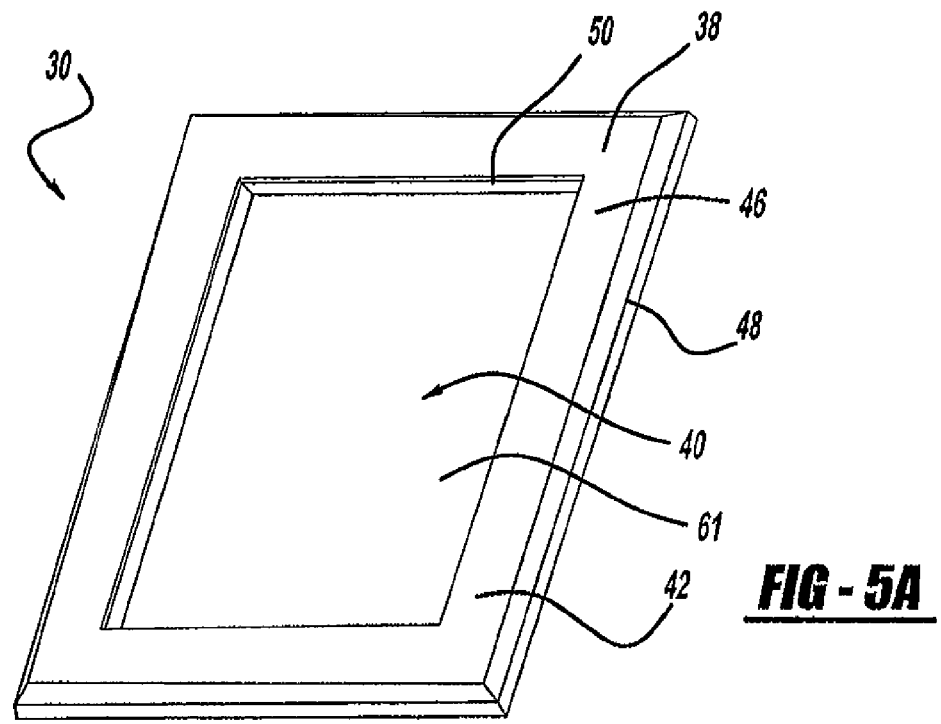
FIG. 5A is a front perspective view of the wall mount assembly shown in FIG. 1.
Figure 5B:
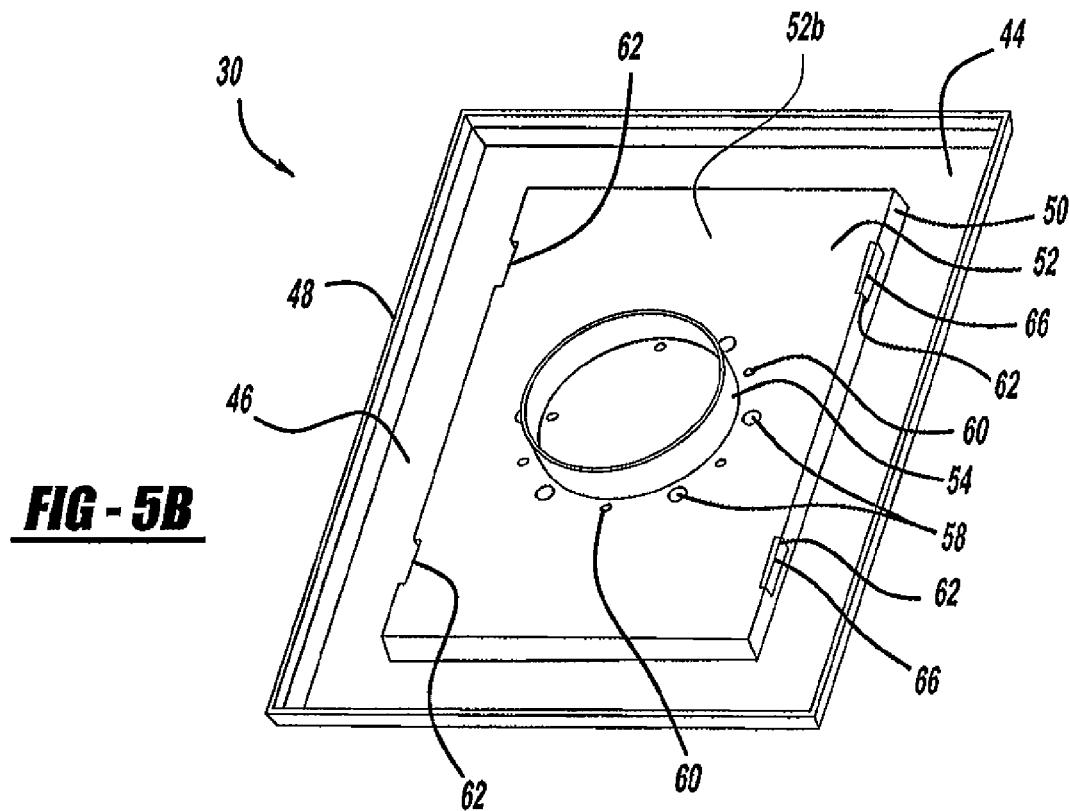
FIG. 5B is a rear perspective view of the wall mount assembly shown in FIG. 1.
Figure 6:
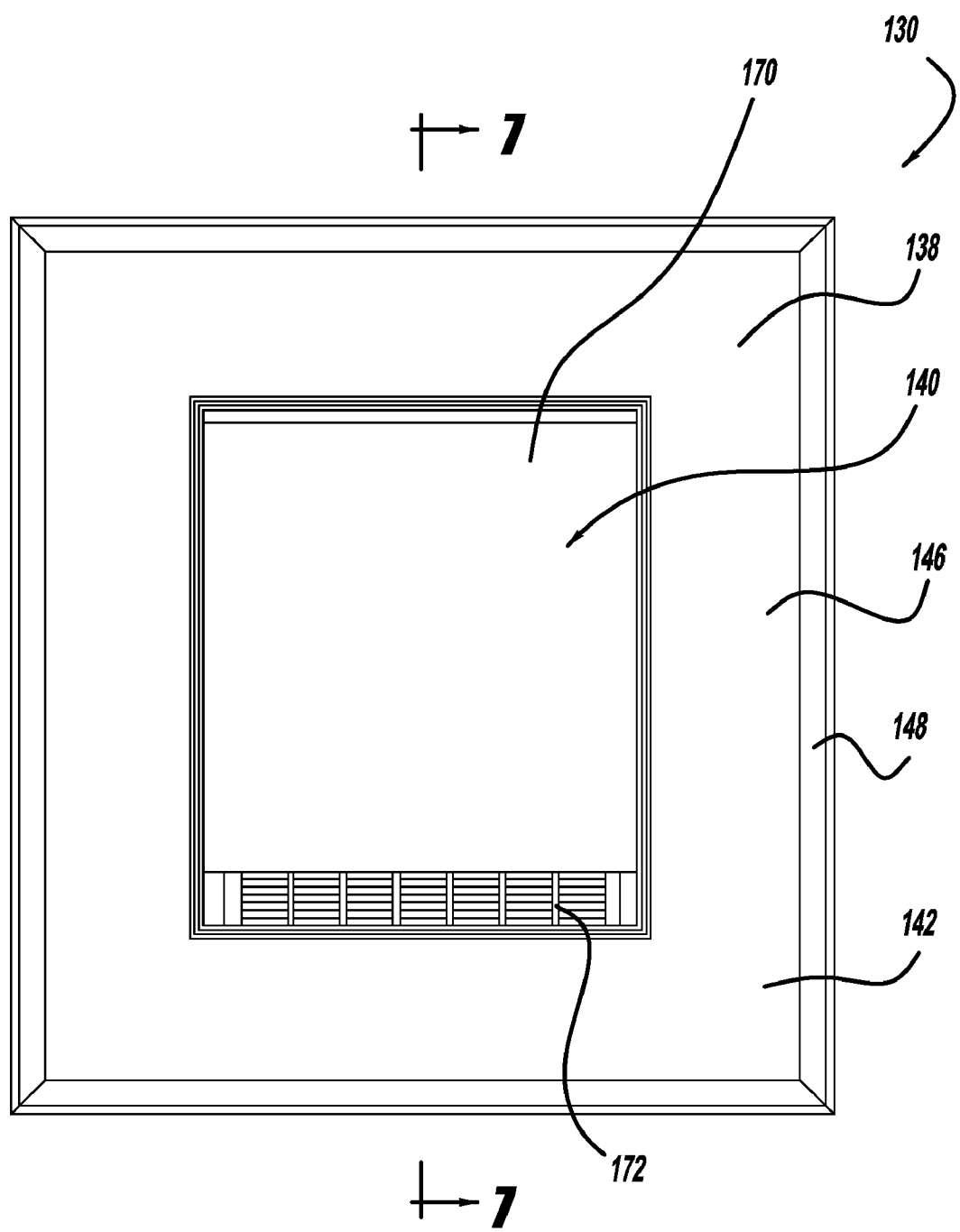
FIG. 6 is a front view of a second embodiment of a wall mount assembly according to the present invention comprising a vent hood.

Referring to FIG. 5B, the edge 50 of the recessed portion 52 also defines mounting apertures 62. The mounting apertures 62 can be positioned at various locations or intervals about the edge 50 depending upon the application of the wall mount assembly 30. Preferably, the recessed portion 52 is rectangular and the mounting apertures 62 are located on opposing edges 50. More preferably, there are two mounting apertures 62 on each of the opposing edges 50.

The cover member 40 can have various configurations depending upon the application of the wall mount assembly 30, as will be described below. For example, the cover member 40 can comprise one part or a plurality of parts. Referring again to FIG. 4, the cover member 40 generally comprises a planar insert 61 defining an outer periphery and having tabs 66 extending therefrom. The tabs 66 are inserted into the mounting apertures 62 to secure the planar insert 61 to the base 38. The cover member 40 can also define an opening sized relative to the annular flange 54, if necessary.

Referring again to FIGS. 5A and 5B, the wall mount assembly 30 has the cover member 40 positioned within the recessed portion 52. FIG. 5B is a rear perspective view of the wall mount 30, illustrating the annular flange 54 as being closed and having the recessed portion 52 not removed. In other words, during application of the wall mount 30, the recessed portion 52 inside of the annular flange 54 can be removed or cutout with a tool to allow wires or the like to extend therethrough, if necessary.

Referring to FIGS. 6-12, the second embodiment of the wall mount assembly 130 is shown as the vent hood. The vent hood assembly 130 comprises a base 138, which is substantially identical to the base 38 described above. FIG. 7 is a cross-sectional view of the vent hood assembly 130 taken along line 7-7 in FIG. 6. The base 138 also includes mounting holes 164 located on opposing edges 150 of the recessed portion 152. Preferably, four mounting holes 164 are disposed on each of the opposing edges 150. The annular flange 154 defines an opening 156 within the recessed portion 152.

Figure 9:
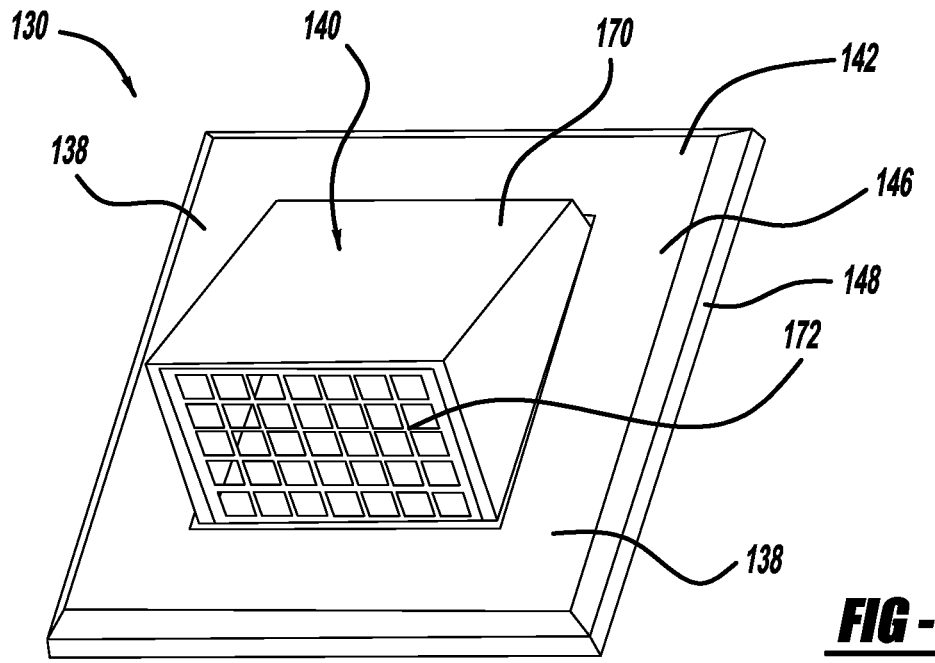
FIG. 9 is a front perspective view of the wall mount assembly shown in FIG. 6.
Figure 10:
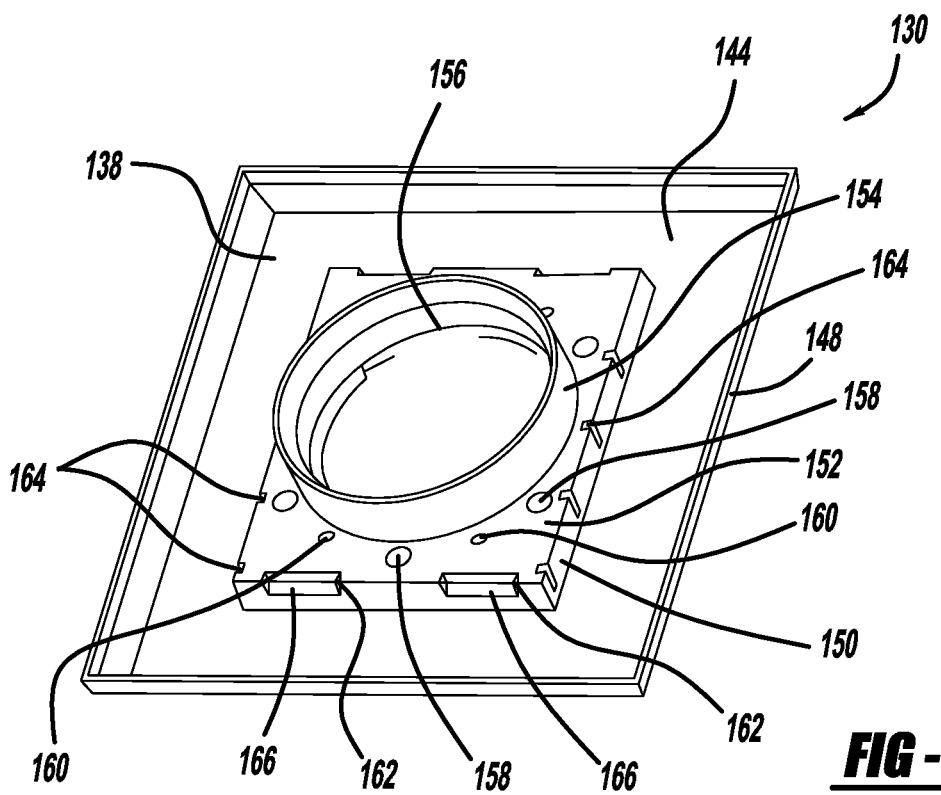
FIG. 10 is a rear perspective view of the wall mount assembly shown in FIG. 6.

FIG. 8 is a bottom view of the vent hood assembly 130 and FIG. 9 is front perspective view of the vent hood assembly 130. FIG. 10 is rear perspective view of the vent hood assembly 130 having the recessed portion 152 removed from within the annular flange 154 for mating with an exhaust vent.

The cover member 140 comprises the generally planar insert 161 having tabs 166 for inserting into the mounting apertures 162 of the base 138. The planar insert 161 includes an opening sized similar to the opening 156 in the annular flange 154. The cover member 140 also comprises a flap 168, a hood 170, and a screen member 172.

Figure 11:
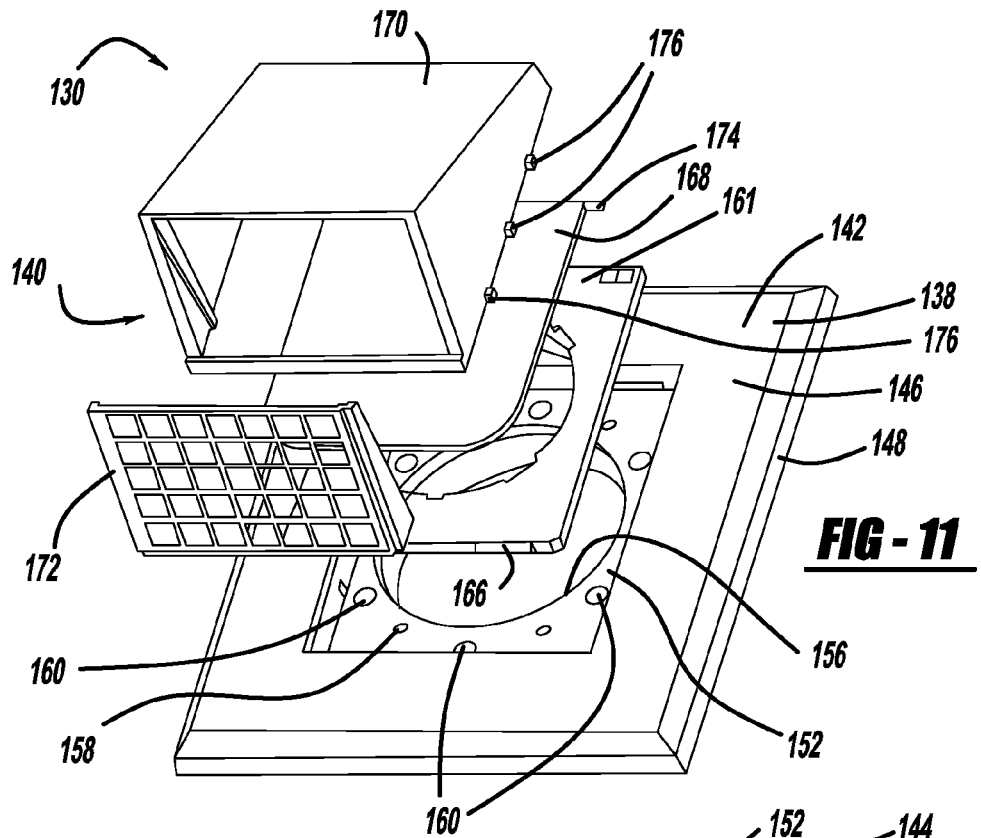
FIG. 11 is an exploded front, bottom perspective view of the wall mount assembly shown in FIG. 6.
Figure 12:
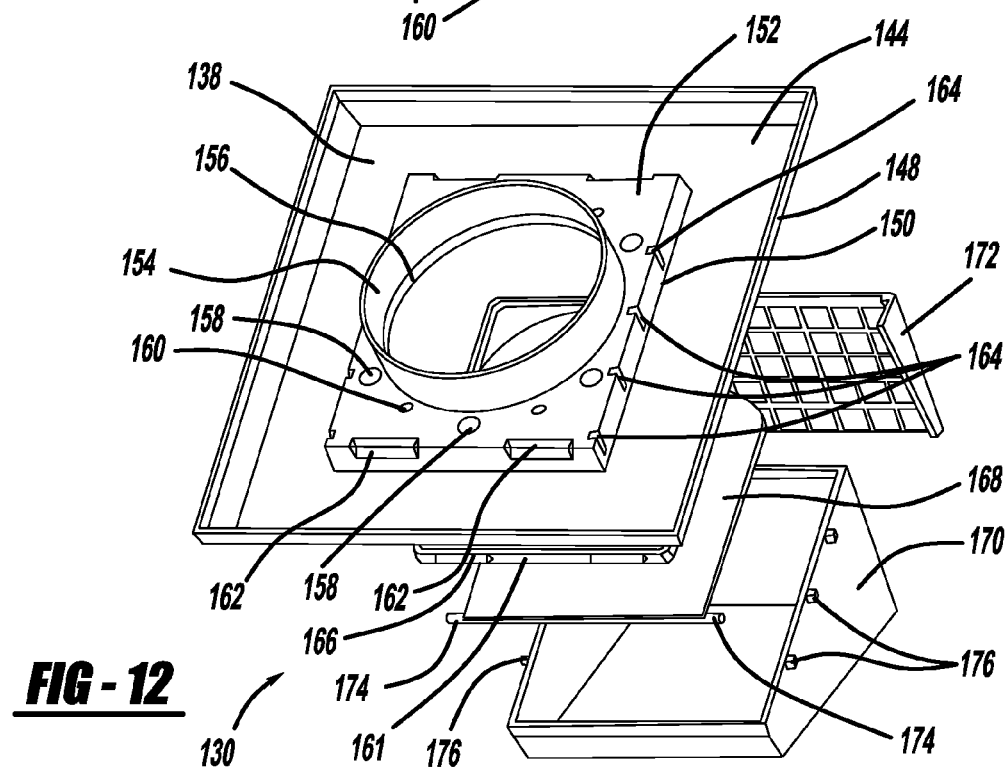
FIG. 12 is an exploded rear, top perspective view of the wall mount assembly shown in FIG. 6.
Figure 13:
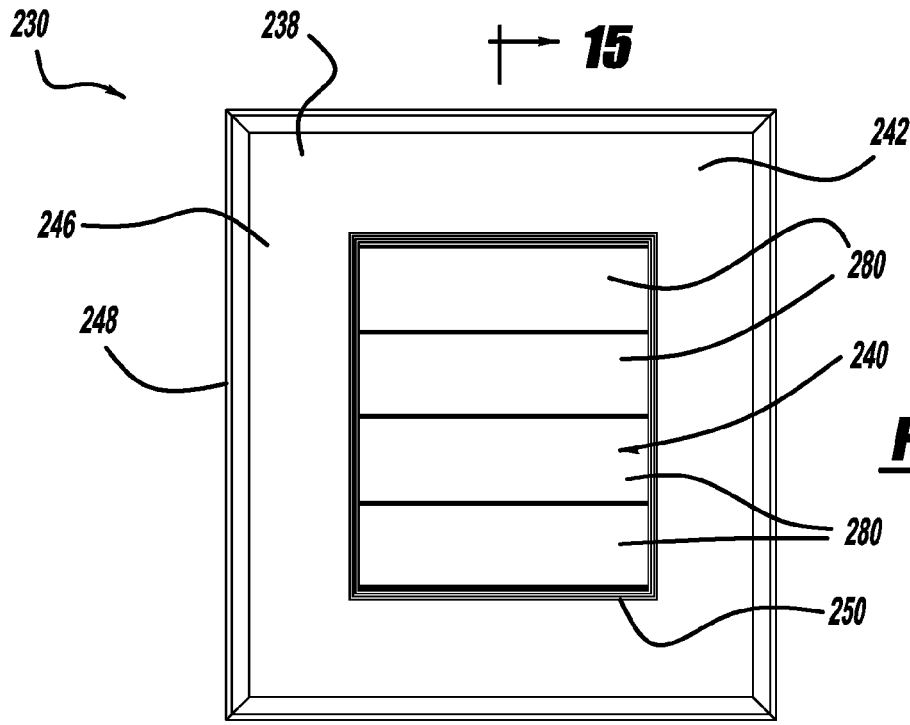
FIG. 13 is a front view of a third embodiment of a wall mount assembly according to the present invention comprising a louvered vent.

Referring now to FIGS. 11 and 12, the flap 168 and the hood 170 are preferably shaped according to the shape of the recessed portion 152. The flap 168 defines an outer periphery and has a rod 174 extending from the outer periphery 146 for engaging the mounting holes 164 in the recessed portion 152. The flap 168 is able to pivot about the rod 174. The hood 170 has mounting pins 176 for engaging the remaining mounting holes 164 and mounting about the flap 168. The screen member 172 slides into the hood 170 to prevent entry into an exhaust vent. Preferably, the screen member 172 is inserted into the hood 170 prior to snapping the hood 170 onto the base 138. Once assembled, the flap 168 is able to freely open and close within the hood 170 to allow exhaust to escape from the exhaust vent.

Figure 14:
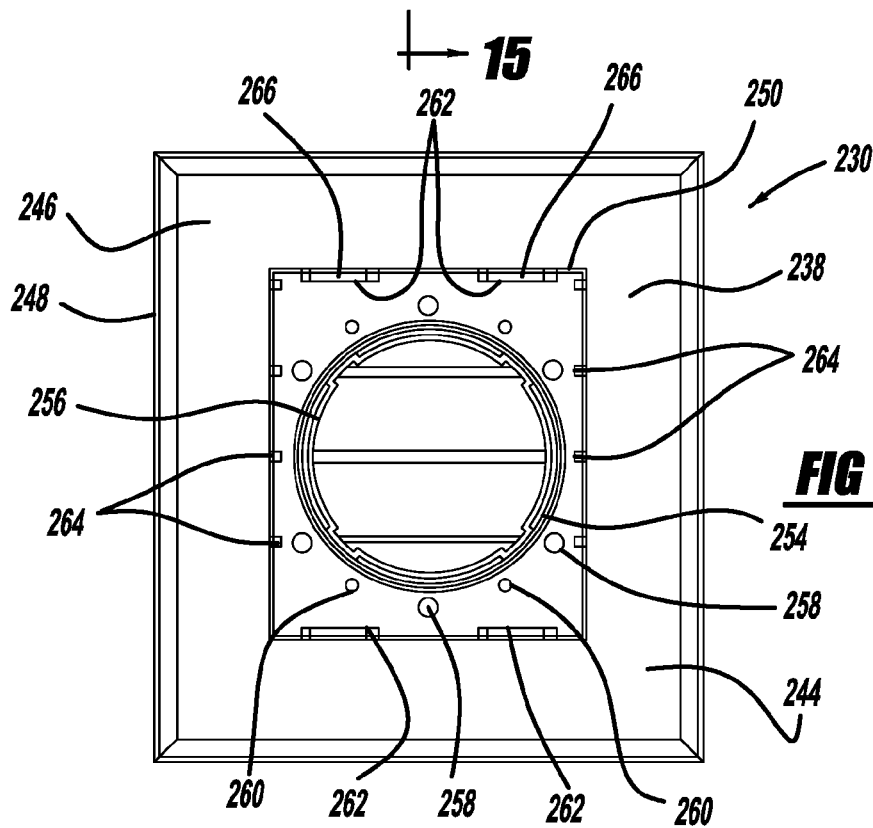
FIG. 14 is a rear view of the wall mount assembly shown in FIG. 13.
Figure 15:
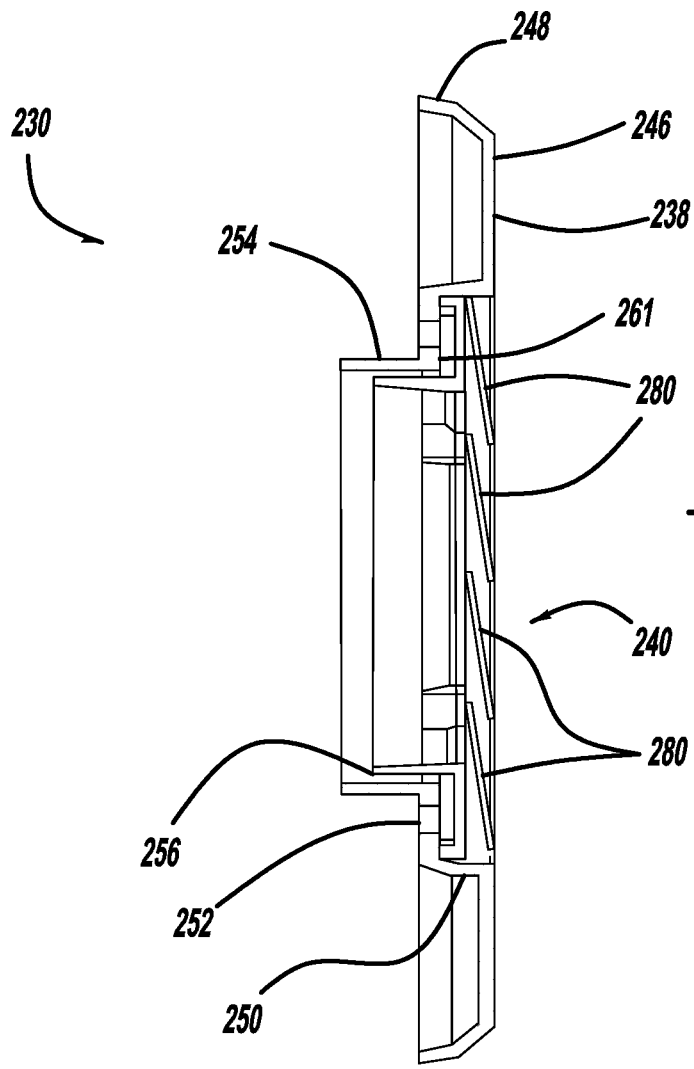
FIG. 15 is a cross-sectional view taken along line 15-15 in FIG. 13 of the wall mount assembly.
Figure 16:
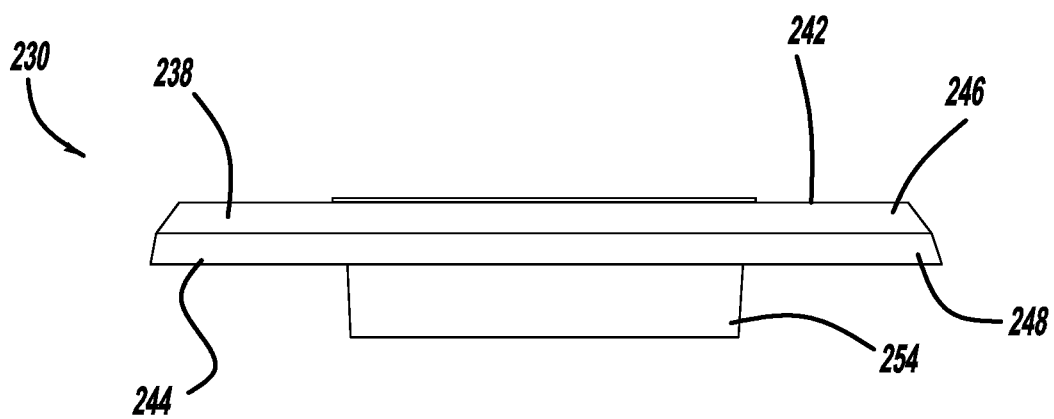
FIG. 16 is a bottom view of the wall mount assembly shown in FIG. 13.
Figure 17:
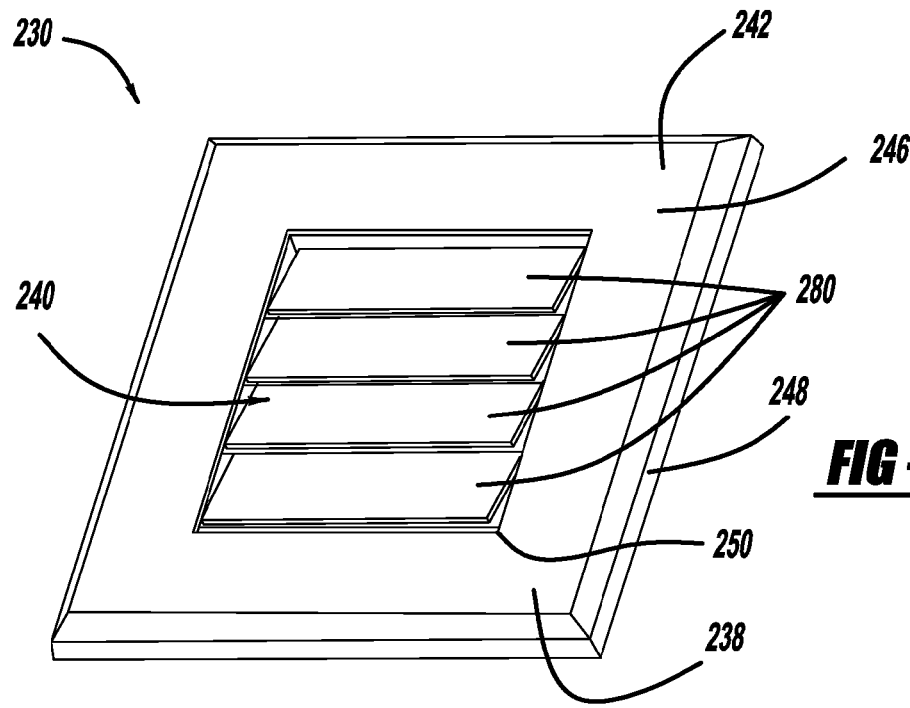
FIG. 17 is front perspective view of the wall mount assembly shown in FIG. 13.
Figure 18:
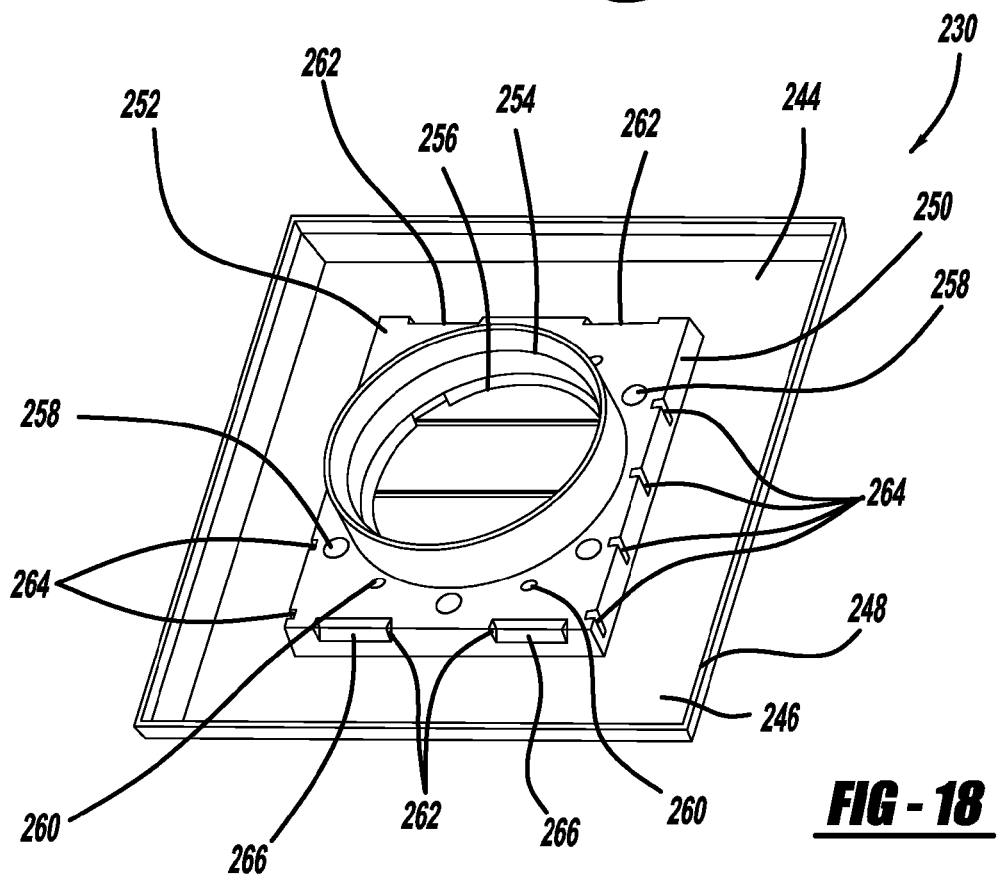
FIG. 18 is a rear perspective view of the wall mount assembly shown in FIG. 13.

Referring to FIGS. 13-20, the third embodiment of the wall mount assembly 230 is shown as the louvered vent. The louvered vent assembly 230 comprises a base 238 substantially identical to the base 138 described above. FIG. 14 is rear view of the louvered vent assembly 230 having the recessed portion 252 removed from within the annular flange 254 for mating with an exhaust vent. FIG. 15 is a cross-sectional view of the louvered vent assembly 230 taken along line 15-15 in FIG. 13. The cover member 240 comprises the generally planar insert 261 having tabs 266 for inserting into the mounting apertures 262 of the base 238. FIG. 16 is a bottom view of the louvered vent assembly 230, FIG. 17 is front perspective view of the louvered vent assembly 230, and FIG. 18 is a rear perspective view of the louvered vent assembly 230.

Figure 19:
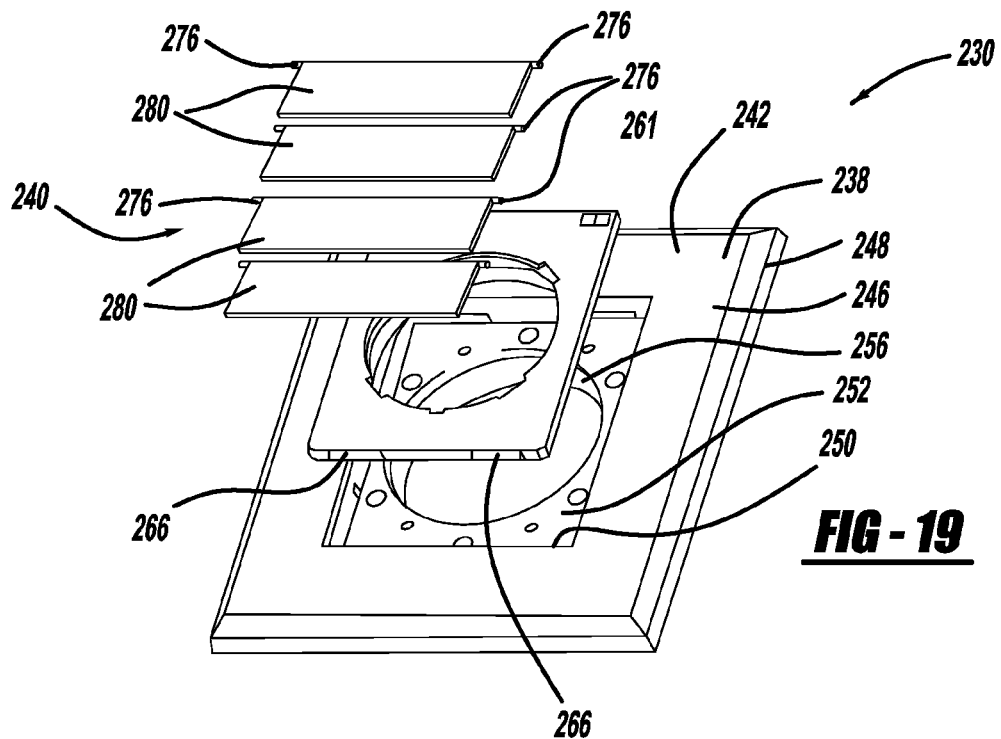
FIG. 19 is an exploded front, bottom perspective view of the wall mount assembly shown in FIG. 13.
Figure 20:
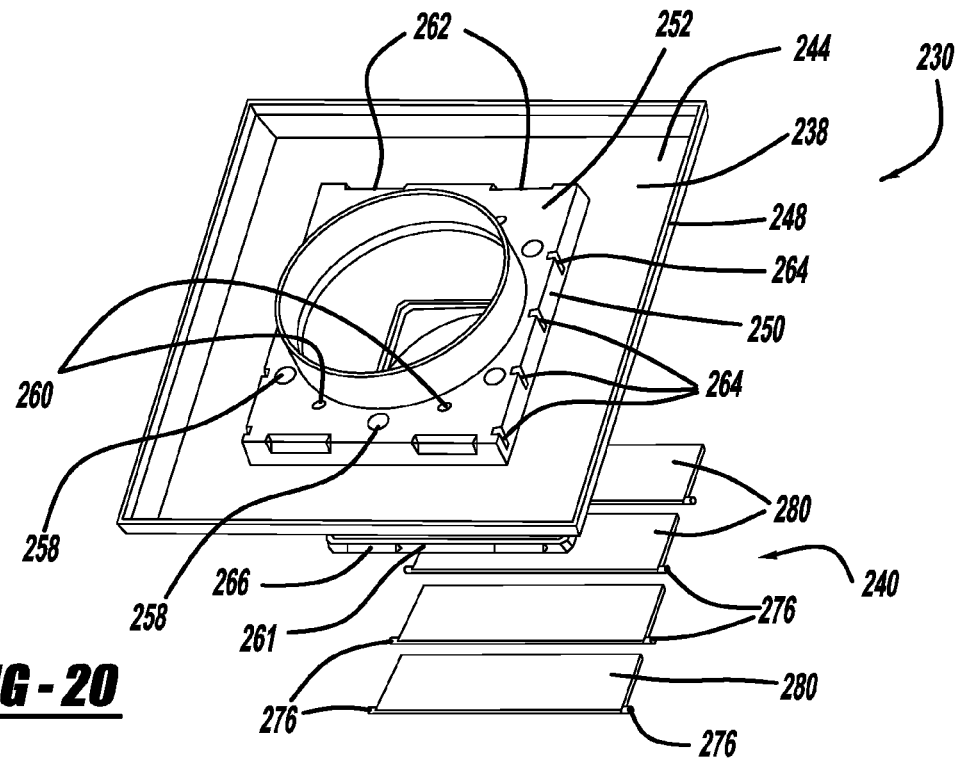
FIG. 20 is an exploded rear, top perspective view of the wall mount assembly shown in FIG. 13.

Referring now to FIGS. 19 and 20, the cover member 240 also comprises a plurality of louvers 280. Each of the louvers 280 extend the width of the recessed portion 252 and has mounting pins 276 for engaging the mounting holes 264 and mounting within the recessed portion 252. The louvers 280 are able to pivot about the mounting pins 276 for allowing exhaust to escape and for preventing access into the exhaust vent.

The bases 38, 138, and 238, respectively, formed according to the present invention can be used as a universal connector for various covering members 40, 140, 240, respectively, as described above. Because a single base 38, 138, and 238, respectively, is operable with different covering members 40, 140, and 240, respectively, manufacturing costs are lessened and installation is simplified. Additionally, because the present invention mounts directly to the building without a member mounted beneath the siding material, the wall mount assemblies 30, 130, and 230, respectively, can be added to existing buildings without have to remove the siding material. Installation only requires the siding material to be removed, such as by cutting a hole, that corresponds to the annular flanges 54, 154, and 254, respectively.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mounting assembly operable to provide a wall mount for fastening to a structure, comprising: a base member; wherein the base member includes: a substantially planar portion having a front surface and a rear surface; an outer peripheral edge portion defining an outer wall portion extending from the front surface to the rear surface; an inner peripheral edge portion defining an inner wall portion extending from the front surface to the rear surface; and a substantially planar recessed portion disposed at a distal end of the inner wall portion being substantially parallel to the front surface and the rear surface, the recessed portion having a front surface and a rear surface, wherein the rear surface includes an annular flange portion extending outwardly therefrom away from the front surface of the recessed portion; and a cover member selectively operable to be brought into removable engagement with the base member.

2. The invention according to claim 1, wherein the inner wall portion includes an area defining at least one mounting aperture formed therein.

3. The invention according to claim 2, wherein the cover member includes at least one tab member formed on a peripheral edge portion thereof.

4. The invention according to claim 3, wherein the tab member is selectively operable to be brought into removable engagement with the mounting aperture.

5. The invention according to claim 1, wherein the recessed portion includes at least one area defining an aperture formed therein for receiving an object selected from the group consisting of a fastener, a sealant, and combinations thereof.

6. The invention according to claim 1, wherein the recessed portion includes at least one area defining an aperture formed therein, wherein a flange portion is formed about the aperture, wherein the flange portion extends from a front surface of the recessed portion towards a rear surface of the recessed portion.

7. The invention according to claim 1, wherein when the cover member is brought into removable engagement with the base member, the cover member is substantially flush with the front surface of the base member.

8. The invention according to claim 1, wherein the structure is a building having an exterior surface formed of a material selected from the group consisting of cementitious material, metal material, plastic material, wood material, and combinations thereof.

9. A mounting assembly operable to provide a vent hood for fastening to a structure, comprising: a base member; wherein the base member includes: a substantially planar portion having a front surface and a rear surface; an outer peripheral edge portion defining an outer wall portion extending from the front surface to the rear surface; an inner peripheral edge portion defining an inner wall portion extending from the front surface to the rear surface; and a substantially planar recessed portion disposed at a distal end of the inner wall portion being substantially parallel to the front surface and the rear surface; wherein the recessed portion includes at least one area defining an aperture formed therein, wherein an annular flange portion is formed about the aperture, wherein the annular flange portion extends from a front surface of the recessed portion towards a rear surface of the recessed portion; and a vent hood cover system selectively operable to be brought into removable engagement with the base member.

10. The invention according to claim 9, wherein the inner wall portion includes a first area defining at least one mounting aperture formed therein and a second area defining at least one aperture formed therein.

11. The invention according to claim 10, wherein the vent hood cover system comprises:
an insert member having a tab member extending therefrom and an area defining an aperture formed in a surface thereof, wherein the tab member is selectively operable to be brought into removable engagement with the mounting aperture of the first area of the inner wall portion.

12. The invention according to claim 11, wherein the vent hood cover system further comprises:
a flap member having a tab member extending therefrom, the tab member being selectively operable to be brought into removable rotational engagement with the aperture of the insert member.

13. The invention according to claim 12, wherein the vent hood cover system further comprises:
a vent hood member having at least one tab member extending therefrom, the tab member being selectively operable to be brought into removable engagement with the aperture of the second area of the inner wall portion.

14. The invention according to claim 10, wherein the vent hood cover system further comprises a removable screen member selectively operable to be brought into removable engagement with the vent hood member.

15. The invention according to claim 11, wherein the insert member includes an area defining an aperture formed in a surface thereof, wherein the aperture of the insert member is substantially aligned with the aperture of the recessed portion.

16. The invention according to claim 9, wherein the recessed portion includes at least one area defining an aperture formed therein for receiving an object selected from the group consisting of a fastener, a sealant, and combinations thereof.

17. The invention according to claim 9, wherein the structure is a building having an exterior surface formed of a material selected from the group consisting of cementitious material, metal material, plastic material, wood material, and combinations thereof.

18. A mounting assembly operable to provide a louver vent for fastening to a structure, comprising: a base member; wherein the base member includes: a substantially planar portion having a front surface and a rear surface; an outer peripheral edge portion defining an outer wall portion extending from the front surface to the rear surface; an inner peripheral edge portion defining an inner wall portion extending from the front surface to the rear surface; and a substantially planar recessed portion disposed at a distal end of the inner wall portion being substantially parallel to the front surface and the rear surface; wherein the recessed portion includes at least one area defining an aperture formed therein, wherein an annular flange portion is formed about the aperture, wherein the annular flange portion extends from a front surface of the recessed portion towards a rear surface of the recessed portion; and a lover vent cover system selectively operable to be brought into removable engagement with the base member.

19. The invention according to claim 18, wherein the inner wall portion includes a first area defining at least one mounting aperture formed therein and a second area defining at least one aperture formed therein.

20. The invention according to claim 19, wherein the louver vent cover system comprises:
an insert member having a tab member extending therefrom, wherein the tab member is selectively operable to be brought into removable engagement with the mounting aperture of the first area of the inner wall portion.

21. The invention according to claim 20, wherein the louver vent cover system further comprises:
at least one louver member having a tab member extending therefrom, the tab member being selectively operable to be brought into removable rotational engagement with the mounting aperture of the second area of the inner wall member.

22. The invention according to claim 20, wherein the insert member includes an area defining an aperture formed in a surface thereof, wherein the aperture of the insert member is substantially aligned with the aperture of the recessed portion.

23. The invention according to claim 18, wherein the recessed portion includes at least one area defining an aperture formed therein for receiving an object selected from the group consisting of a fastener, a sealant, and combinations thereof.

24. The invention according to claim 18, wherein the structure is a building having an exterior surface formed of a material selected from the group consisting of cementitious material, metal material, plastic material, wood material, and combinations thereof.

25. A mounting assembly operable to provide a wall mount for fastening to a structure, comprising: a base member; wherein the base member includes: a substantially planar portion having a front surface and a rear surface; an outer peripheral edge portion defining an outer wall portion extending from the front surface to the rear surface; an inner peripheral edge portion defining an inner wall portion extending from the front surface to the rear surface; and a substantially planar recessed portion disposed at a distal end of the inner wall portion being substantially parallel to the front surface and the rear surface; and a cover member selectively operable to be brought into removable engagement with the base member; wherein the recessed portion includes at least one area defining an aperture formed therein, wherein an annular flange portion is formed about the aperture, wherein the annular flange portion extends from a front surface of the recessed portion towards a rear surface of the recessed portion.

26. The invention according to claim 25, wherein the inner wall portion includes an area defining at least one mounting aperture formed therein.

27. The invention according to claim 26, wherein the cover member includes at least one tab member formed on a peripheral edge portion thereof.

28. The invention according to claim 27, wherein the tab member is selectively operable to be brought into removable engagement with the mounting aperture.

29. The invention according to claim 25, wherein the recessed portion includes at least one area defining an aperture formed therein for receiving an object selected from the group consisting of a fastener, a sealant, and combinations thereof.

30. The invention according to claim 25, wherein when the cover member is brought into removable engagement with the base member, the cover member is substantially flush with the front surface of the base member.

31. The invention according to claim 25, wherein the structure is a building having an exterior surface formed of a material selected from the group consisting of cementitious material, metal material, plastic material, wood material, and combinations thereof.

32. A mounting assembly operable to provide a wall mount for fastening to a structure, comprising: a base member; wherein the base member includes: a substantially planar portion having a front surface and a rear surface; an outer peripheral edge portion defining an outer wall portion extending from the front surface to the rear surface; an inner peripheral edge portion defining an inner wall portion extending from the front surface to the rear surface; and a substantially planar recessed portion disposed at a distal end of the inner wall portion being substantially parallel to the front surface and the rear surface; the recessed portion having a front surface and a rear surface, wherein the rear surface includes an annular flange portion extending outwardly therefrom away from the front surface of the recessed portion; and a cover member selectively operable to be brought into removable engagement with the base member; wherein the inner wall portion includes an area defining at least one mounting aperture formed therein.

33. The invention according to claim 32, wherein the cover member includes at least one tab member formed on a peripheral edge portion thereof.

34. The invention according to claim 33, wherein the tab member is selectively operable to be brought into removable engagement with the mounting aperture.

35. The invention according to claim 32, wherein the recessed portion includes at least one area defining an aperture formed therein for receiving an object selected from the group consisting of a fastener, a sealant, and combinations thereof.

36. The invention according to claim 32, wherein the recessed portion includes at least one area defining an aperture formed therein, wherein a flange portion is formed about the aperture, wherein the flange portion extends from a front surface of the recessed portion towards a rear surface of the recessed portion.

37. The invention according to claim 32, wherein when the cover member is brought into removable engagement with the base member, the cover member is substantially flush with the front surface of the base member.

38. The invention according to claim 32, wherein the structure is a building having an exterior surface formed of a material selected from the group consisting of cementitious material, metal material, plastic material, wood material, and combinations thereof.

39. A mounting assembly operable to provide a wall mount for fastening to a structure, comprising: a base member; wherein the base member includes: a substantially planar portion having a front surface and a rear surface; an outer peripheral edge portion defining an outer wall portion extending from the front surface to the rear surface; an inner peripheral edge portion defining an inner wall portion extending from the front surface to the rear surface; and a substantially planar recessed portion disposed at a distal end of the inner wall portion being substantially parallel to the front surface and the rear surface; the recessed portion having a front surface and a rear surface, wherein the rear surface includes an annular flange portion extending outwardly therefrom away from the front surface of the recessed portion; and a cover member selectively operable to be brought into removable engagement with the base member; wherein the recessed portion includes at least one area defining an aperture formed therein, wherein the annular flange portion is formed about the aperture, wherein the annular flange portion extends from a front surface of the recessed portion towards a rear surface of the recessed portion.

40. The invention according to claim 39, wherein the inner wall portion includes an area defining at least one mounting aperture formed therein.

41. The invention according to claim 40, wherein the cover member includes at least one tab member formed on a peripheral edge portion thereof.

42. The invention according to claim 41, wherein the tab member is selectively operable to be brought into removable engagement with the mounting aperture.

43. The invention according to claim 39, wherein the recessed portion includes at least one area defining an aperture formed therein for receiving an object selected from the group consisting of a fastener, a sealant, and combinations thereof.

44. The invention according to claim 39, wherein when the cover member is brought into removable engagement with the base member, the cover member is substantially flush with the front surface of the base member.

45. The invention according to claim 39, wherein the structure is a building having an exterior surface formed of a material selected from the group consisting of cementitious material, metal material, plastic material, wood material, and combinations thereof.

* * * * *